United States Patent [19]

Thomas et al.

[11] 3,864,673
[45] Feb. 4, 1975

[54] ANNUNCIATOR FOR AN ELECTRICAL SYSTEM INCLUDING BUILT-IN TEST EQUIPMENT

[75] Inventors: Geary L. Thomas, Cypress; Raymond G. Kostanty, Long Beach; David San Julian, Stanton, all of Calif.

[73] Assignee: The Bendix Corporation, Teterboro, N.J.

[22] Filed: Dec. 17, 1973

[21] Appl. No.: 425,480

[52] U.S. Cl. ............................. 340/214, 340/409
[51] Int. Cl. .................................... G08b 29/00
[58] Field of Search ......... 340/214, 409; 235/151.3, 235/92 MT, 92 QC; 328/120; 324/73 R

[56] References Cited
UNITED STATES PATENTS

| | | | |
|---|---|---|---|
| 3,278,920 | 10/1966 | Sargent et al. | 340/214 |
| 3,383,672 | 5/1968 | Clarridge | 340/248 A |
| 3,680,069 | 8/1972 | Neumann et al. | 340/214 |
| 3,689,920 | 9/1972 | Moline | 340/214 |
| 3,735,396 | 5/1973 | Getchell | 340/409 |
| 3,787,838 | 1/1974 | Feintuch et al. | 340/409 |

*Primary Examiner*—Donald J. Yusko
*Assistant Examiner*—Richard P. Lange
*Attorney, Agent, or Firm*—Anthony F. Cuoco; S. H. Hartz

[57] ABSTRACT

An annunciator for use with an electrical system having built-in equipment for self testing purposes. The progress of a test sequence is monitored in that successful and failed test steps in the sequence are annunciated. The annunciator locks the test equipment in a failed step to facilitate trouble shooting for determining the cause of the failure. The equipment is driven by the system under test to eliminate the need for external power sources.

8 Claims, 5 Drawing Figures

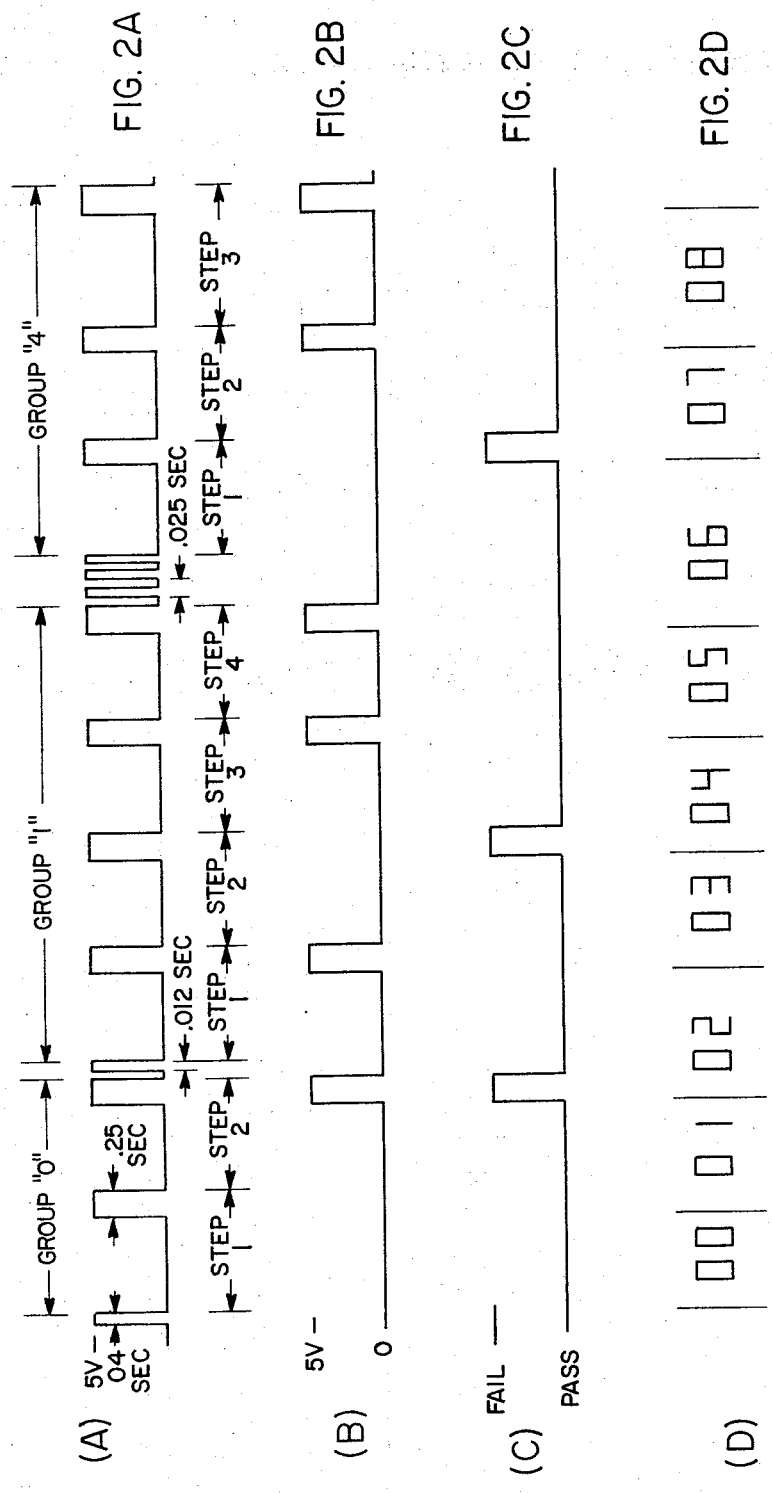

ANNUNCIATOR FOR AN ELECTRICAL SYSTEM INCLUDING BUILT-IN TEST EQUIPMENT

CROSS REFERENCE TO RELATED APPLICATIONS

The invention herein described may be used with an electrical system including built-in test equipment such as described in copending U.S. Application 267,285, filed June 29, 1972 now U.S. Pat. No. 3,787,838 by Martin W. Feintuch and Allan S. Silver and assigned to The Bendix Corporation, assignee of the present invention.

BACKGROUND OF THE INVENTION

1. Field of the Invention

This invention relates generally to electrical systems of the type having built-in equipment for self testing purposes and particularly to annunciators used with said systems for monitoring the progress of a test sequence.

2. Description of the Prior Art

Aircraft control systems and the like require automatic self-testing capability to ensure performance of required functions. In order for this capability to have maximum utility it is necessary to annunciate the progress of an associated test sequence. Proper annunciation makes it possible to determine the area of the test sequence in which a failure has occurred and this enhances trouble shooting procedures. When airborne equipment is involved it is also desirable that such a annunciator derive its power from the system under test so as to preclude external power sources for facilitating on-board testing as well as shop testing during normal maintainence procedures. Prior to the present invention there has not been equipment to satisfactorily satisfyy the aforegoing purposes.

SUMMARY OF THE INVENTION

This invention contemplates a device of the type described for use with a system including built-in equipment for self-testing purposes and which system provides a first pulse train indicative of the count of the steps in a test sequence and a second pulse train indicative of whether or not the test steps have been successfully completed. Failures are initially imposed upon the equipment to test internal circuitry. The first and second pulse trains drive pass or fail indicators and counters provide a count of the cumulative number of tests performed for indicating the progress of the test sequence. If a failure occurs a stop command is generated which locks the system to facilitate trouble shooting.

The main object of this invention is to provide an annunciator for a electrical system of the type including built-in test equipment, said annunciator monitoring the progress of a self-test sequence.

Another object of this invention is to provide an annunciator of the type described which is driven by the system under test so as to eliminate the requirement for external power sources.

Another object of this invention is to annunciate successful and unsuccessful steps in the self-test sequence, and to display the cumculative number of tests performed for indicating the progress of the sequence.

Another object of this invention is to lock the test equipment in a failed test to facilitate trouble shooting.

The foregoing and other objects and advantages of the invention will appear more fully hereinafter from a consideration of the detailed description which follows, taken together with the accompanying drawings herein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 2A is a graphical representation of a pulse train provided by a system with which the invention is used, and which pulse train is indicative of the number of test steps in a test sequence.

FIG. 2B is a graphical representation of another pulse train provided by said system, and which pulse train is indicative of test steps in the sequence which have been successfully completed.

FIG. 2C is a graphical representation of a pulse train which is generated internal to the annunciator of the invention for annunciating a "fail" or "pass" test step condition.

FIG. 2D is a graphical representation of visual read outs provided by the device of the invention for indicating the progress of a test sequence.

DESCRIPTION OF THE INVENTION

Figure 1:
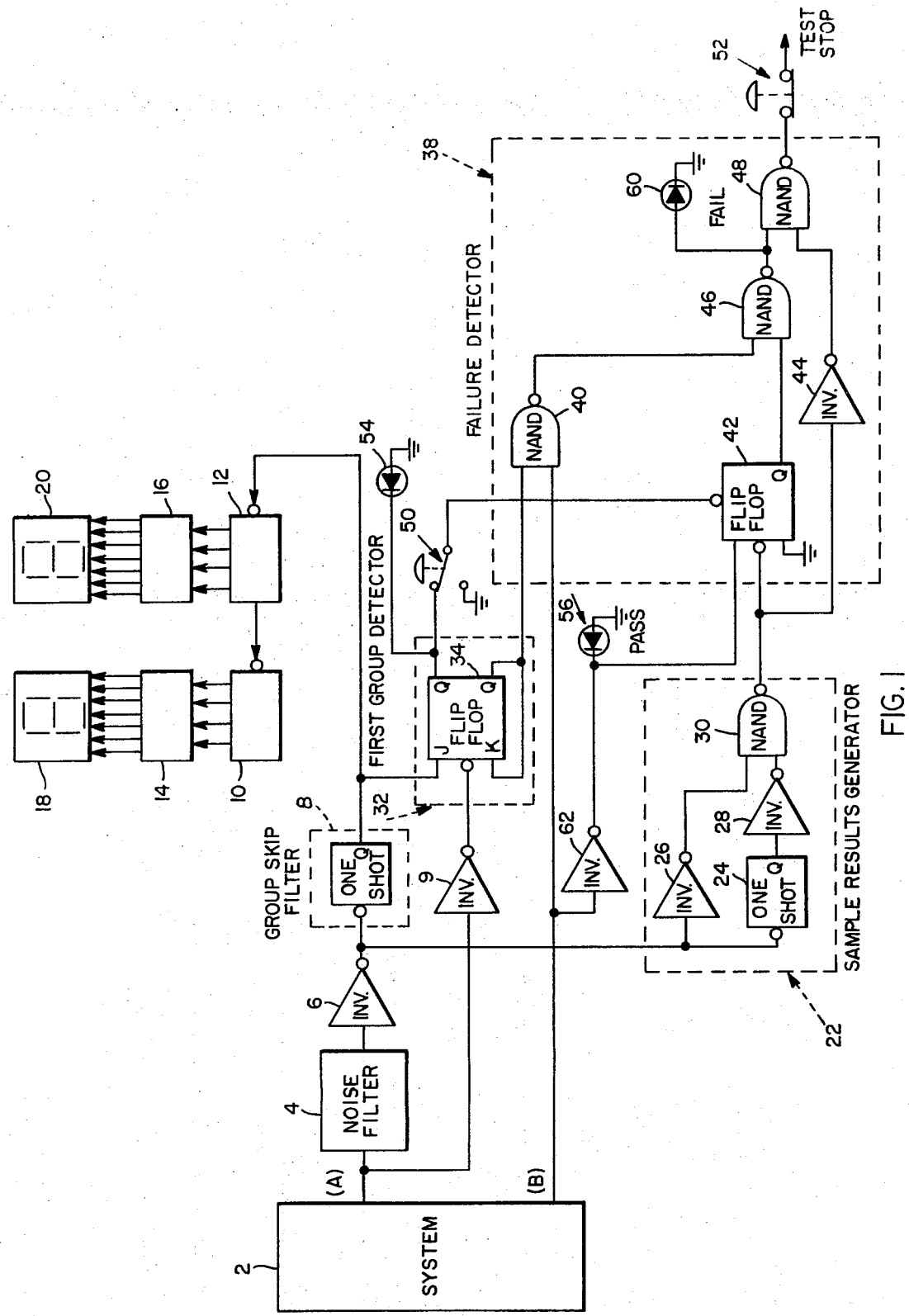
FIG. 1 is a block diagram-electrical schematic of an annunciator for an electrical system including built-in test equipment according to the invention.

FIG. 1 shows an electronic system designated generally by the FIG. 2 and which system 2 is of the type including built-in test equipment as described in the aforenoted copending U.S. Application Ser. No. 267,285 now U.S. Pat. No. 3,787,838 System 2 provides a first pulse train as shown in FIG. 2A and a second pulse train as shown in FIG. 2B. These pulse trains provide pulses which are designated and will hereinafter be referred to as (A) and (B), respectively.

Pulses (A) are indicative of the number of steps in a test sequence performed by the built-in test equipment of system 2. For purposes of illustration, the test sequence, as shown in FIG. 2A, includes group 0 having two steps, group 1 having four steps and group 4 having three steps.

Prior to initiation of a self-test sequence, no power is applied to the test equipment and at this time pulses (A) are at zero level. When power is applied a self-test sequence is implemented and a short pulse ( .04 sec.) at a level of five volts occurs, and step one of group 0 of the test sequence is initiated as shown in FIG. 2A.

The duration of each step in the test sequence varies as a function of the group number or the step number within any given group. However, at 0.25 seconds before the end of any test step, a pulse is provided at the five volt level and the next test step starts as this pulse drops from five volts to zero volts as shown in FIG. 2A. After the last step of a given test group is completed another short pulse (0.012 sec.) at the five volt level (hereinafter referred to as the group skip pulse) occurs. This advances counters included in the annunciator as shown in FIG. 1 to the first step of the next test group.

As further shown in FIG. 2A, the test sequence may be completed through all groups as during a system test or through only a portion of the groups as during in-route or preland test when system 2 is an aircraft control system. When an abbreviated test is in progress, one additional group skip pulse occurs for each group being skipped, therefore fIG. 2A shows two additional pulses between groups 1 and 4, and which pulses designate skipped groups 2 and 3.

Pulses (B) shown in FIG. 2B are indicative of whether or not the test steps in the test sequence of FIG. 2A have been successfully completed. The first group of the test sequence, as heretofore noted, is used to check internal circuitry. During this first group, successful tests are indicated by a zero volt level during the last 0.25 seconds of each test step. A five volt level during the last 0.25 seconds of each test step indicates a "fail" condition. For any group other than the first group the opposite is true, i.e., a five volt level at the end of the test step indicates a "pass" condition and a zero volt level indicates a "fail" condition. The aforegoing relationship is seen by comparing the graphical representations of FIG. 2A, 2B and 2C.

Referring now to FIG. 1, pulses (A) are applied to a noise filter 4, which may be a resistance-capacitance network for filtering noise spikes from the pulses, and through an inverter to a non-retriggerable 0.7 second one-shot multivibrator 8. Multivibrator 8 is triggered when pulses (A) go from zero to five volts and remains triggered during a 0.45 second period following the end of each step. Any group skip pulses occurring do not retrigger multivibrator 8 and therefore do not appear at the output of the multivibrator.

Multivibrator 8 drives a pair of decade counters 10 and 12. The decade counters ignore group skip pulses and advance once for each step in the test sequence. The counter outputs are converted to a seven segment format by converters 14 and 16, and which converters drive a pair of visual displays 18 and 20. Visual displays 18 and 20 indicate the cumulative number of tests steps in the test sequence which have been performed and provide visual read outs as indicated in FIG. 2D. In this connection it is noted that the counters are triggered 0.25 seconds before the end of a test step and at this time provide the cumulative read out of test steps performed as shown in FIG. 2D.

Pulses (A) are examined within the last few microseconds of the end of each test step to determine the success or failure of the step. Ordinarily, if a failure is detected counters 10 and 12 would be inhibited at the next step after the failed step and would thus provide a misleading read out. To circumvent this problem, a sample results generator 22 is provided which examines the pulses about 0.165 seconds before the end of each step to detect failed steps.

Sample results generator 22 includes a .085 second non-triggerable one shot multivibrator 24 connected to inverter 6, and which multivibrator is triggered on the zero to five volt transition of pulses (A). Sample results generator 22 further includes an inverter 26 connected to inverter 6 and an inverter 28 connected to one-shot 24. A NAND gate 30 is connected to inverters 26 and 28. The output of gate 30 is low (zero volts) for the first part of the step.

Since pulses (B) indicate a test failure by a high (five volts) during test group 0 and a low (zero volts) during all other groups as heretofore noted, a circuit is required which distinguishes between group 0 and the other groups. This is accomplished by a first group detector designated by the numberal 32. First group detector 32 includes a JK flip-flop 34 connected to one shot 8, and which flip-flop receives pulses (A) through an inverter 9. The J input of the flip-flop is enabled for .45 seconds after the end of each step (in addition to 0.25 seconds before the end of each step). If, during this 0.45 second period, a positive pulse (A) occurs, flip-flop 34 changes states and remains latched in its new state until manually reset (manual reset now shown). Since group 0 is always tested before the other groups, the first group detector output is an indication that group 0 has been completed.

A failure detector 38 includes a NAND gate 40 connected to flip-flop 34 and connected to system 2 for receiving pulses B, a flip-flop 42 connected to NAND gate 30 and connected to flip-flop 34 through a normally closed manually operated switch 50, an inverter 44 connected to NAND gate 30, and NAND gates 46 and 48. The output of NAND gate 40 goes low if a failure is detected during group 0. Failures after group 0 are detected by the output of flip-flop 42 which is then low. Flip-flop 42 is inhibited during group 0 because of its connection through switch 50 to flip-flop 34. Inverter 44 prevents failures in group 0 from being detected until the last .165 seconds of the step in the group.

When a failure is detected, gate 48, and which gate is connected to inverter 44 and to NAND gate 46, said NAND gate 46 being in trun connected to NAND gate 40, provides a "test-stop" output through a manually operated, normally closed switch 52. The test step output automatically stops the system, to facilitate trouble shooting of the failure. The manual opening of the switch inhibits this automatic stop feature as may be desired in some applications or may be used to allow the test sequence to proceed after a failed test step.

Visual annunciation is provided by indicators 54, 56 and 60, and which indicators may be conventional light emitting diodes. Thus, light emitting diode 54 is connected to flip-flop 34 and is "on" when the test sequence is in the first group, i.e., when failures are imposed upon the system to test internal circuitry. Light emitting diode 56 is connected through an inverter 62 to system 2 and is responsive to pulses (B) for providing an indication when a particular step in the test sequence has been successfully passed. Likewise, light emitting diode 60 is connected to the output of NAND gate 46 for providing an indication when a test step has failed.

It will now be seen from the aforenoted description of the invention that an annunciator has been provided which may be used with an electrical system including built-in test equipment. The annunciator monitors the progress of the equipment during self test, indicates what sections of a test sequence have failed and locks the equipment upon a failed test to enable trouble shooting of the problem. Pass and fail conditions as well as the condition wherein failures are imposed on the equipment to test internal circuitry are annunciated. Counters are provided for indicating where the test step being performed is in relation to the test sequence. The device of the invention is particularly useful for airborne equipment such as automatic flight control systems since external power sources are not required.

Although but a single embodiment of the invention has been illustrated and described in detail, it is to be expressly understood that the invention is not limited thereto. Various changes may also be made in the design and arrangement of the parts without departing

What is claimed is:

1. For use with a system of the type including built in test equipment for self-testing purposes, and which system provides first pulses indicative of the count of the steps in a test sequence and second pulses indicative of the successfully completed steps, an annunciator comprising:

counting means connected to the system and responsive to the first pulses for annunciating the count of the steps in the test sequence;

sampling means connected to the system for sampling the first pulses prior to the completion of a test step and for providing an output indicative of a failure of said step;

test step group detecting means connected to the system and responsive to the first pulses for detecting the completion of a predetermined first group of test steps in the test sequence and for providing an output indicative of the completion of said first group; and failure detecting means connected to the system, the sampling means and the group detecting means and responsive to the second pulses, the sampling means output and the group detecting means output for providing an output indicative of a failed test step in a group other than the first group.

2. An annunciator as described by claim 1, wherein:
the first pulses include pulses indicative of skipped test groups; and
filter means connected to the system and to the counter for filtering the group skip pulses so that the counter is unresponsive to said pulses.

3. An annunciator as described by claim 2, wherein:
the test group detecting means is connected to the filter means so that first group detecting means is unresponsive to the group skip pulses.

4. An annunciator as described by claim 1, including:
indicating means connected to the test step group detecting means for indicating when the test sequence is in the first group.

5. An annunciator as described by claim 1, including:
indicating means connected to the system and responsive to the second pulses for indicating the successful completion of a test step.

6. An annunciator as described by claim 1, wherein:
the failure detecting means includes indicating means for indicating a failed test step.

7. An annunciator as described by claim 1, wherein:
the failure detecting means includes means responsive to the output indicative of a failed test step for providing a test step output; and
a manually operated manually closed switch is connected to the test step output means and to the system for applying said output to stop the system upon a failed test step, with said switch being opened to permit the test sequence to proceed upon said failed test step.

8. An annunciator as described by claim 1, wherein the counting means includes:
display means for providing displays indicative of the cumulative number of test steps in the test sequence which have been performed.

* * * * *